United States Patent [19]

Baldwin

[11] Patent Number: 4,617,836
[45] Date of Patent: Oct. 21, 1986

[54] TRANSMISSION SYSTEMS FOR TRACKED VEHICLES

[75] Inventor: David A. Baldwin, Woking, England

[73] Assignee: The Secretary of State for Defence in Her Britannic Majesty's Government of the United Kingdom of Great Britain and Northern Ireland, London, England

[21] Appl. No.: 629,972

[22] Filed: Jul. 11, 1984

[30] Foreign Application Priority Data

Jul. 12, 1983 [GB] United Kingdom ................. 8318862

[51] Int. Cl.[4] ........................................... F16H 37/06
[52] U.S. Cl. ............................. 74/682; 74/665 GA; 74/705; 74/714
[58] Field of Search ...................... 74/714, 705, 720.5, 74/681, 682, 665 GA

[56] References Cited

U.S. PATENT DOCUMENTS

| | | | |
|---|---|---|---|
| 2,377,354 | 6/1945 | Merritt | 180/9.2 |
| 2,930,257 | 3/1985 | Christenson | 74/710.5 X |
| 3,373,636 | 3/1968 | Livezey et al. | 74/720.5 |
| 3,377,885 | 4/1968 | Tuck et al. | 74/705 X |
| 3,405,574 | 10/1968 | Livezey | 74/720.5 |
| 3,468,192 | 9/1969 | Nasvytis | 74/682 |
| 3,529,492 | 9/1970 | Tuck | 74/720.5 |
| 3,534,635 | 10/1970 | Polak | 74/720.5 |
| 3,535,954 | 10/1970 | Chambers et al. | 74/720.5 |
| 3,554,054 | 1/1971 | Nasvytis | 74/682 |
| 3,575,066 | 4/1971 | Livezey | 74/720.5 |
| 3,687,210 | 8/1972 | Schaefer | 74/720.5 X |
| 4,345,488 | 8/1982 | Reed | 74/682 |
| 4,497,218 | 2/1985 | Zaunberger | 74/682 |
| 4,523,493 | 6/1985 | Weib | 74/714 X |

FOREIGN PATENT DOCUMENTS 1206670 4/1958 France .
933125 8/1963 United Kingdom ............... 74/720.5

OTHER PUBLICATIONS

Merritt, H. E., "The Evolution of a Tank Transmission", Procedures in Mechanical Engineering, vol. 154, pp. 412–428.

Primary Examiner—Kenneth J. Dorner
Assistant Examiner—Joseph M. Rolnicki
Attorney, Agent, or Firm—Cushman, Darby & Cushman

[57] ABSTRACT

A transmission system which provides a tracked vehicle with a maximum rate of turn that decreases as higher forward gear-ratios are selected and, consequently, high low-speed manoeuvrability combined with relatively low, and therefore safe, maximum rates of turn at high vehicle speeds. This is achieved by means of a modifying differential arranged to rotate a steering input member of a steering differential at a rate equal to a multiple of the rotational speed of a power input member less a multiple of the rotational speed of the output member of a gear unit.

3 Claims, 2 Drawing Figures

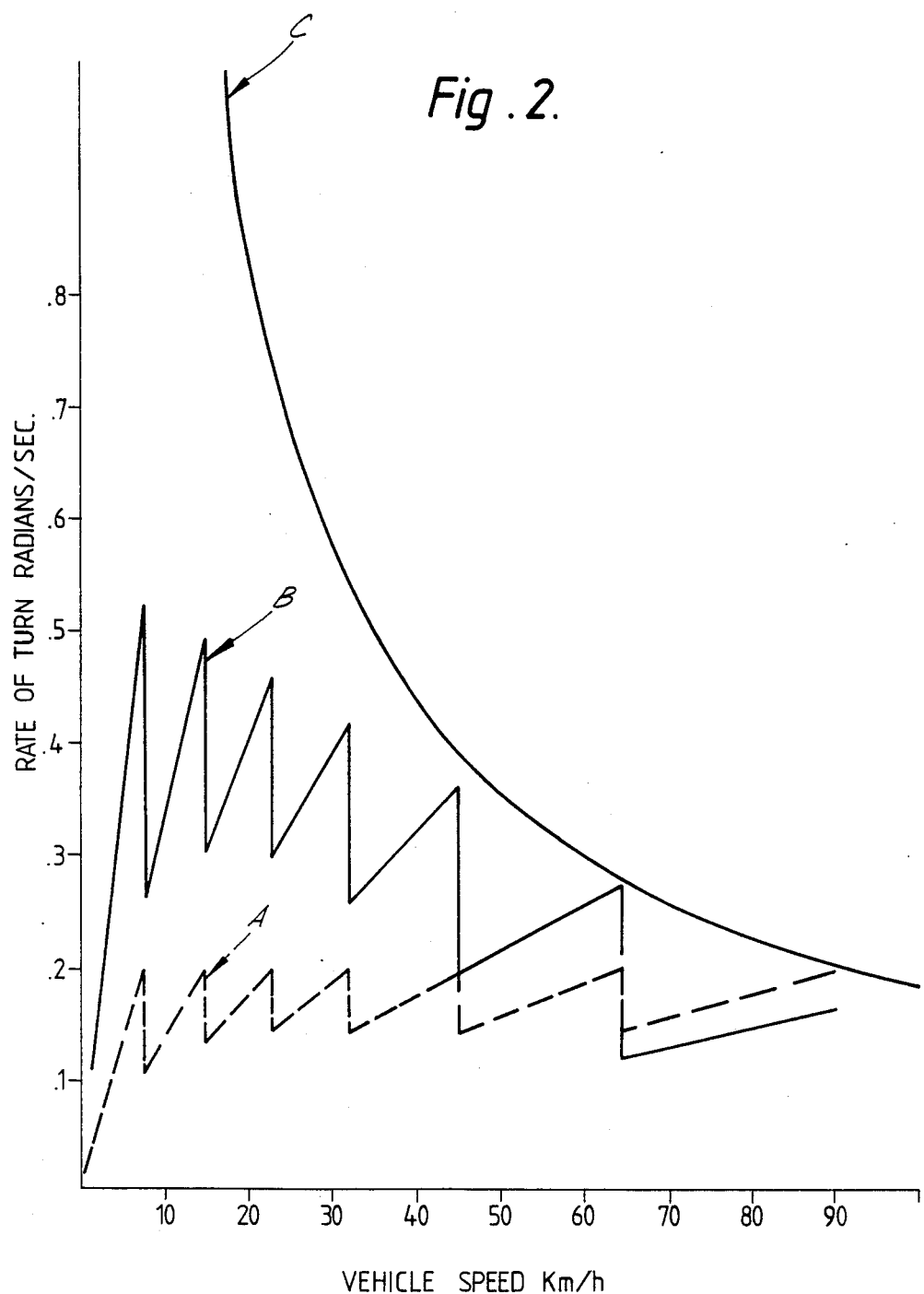

TRANSMISSION SYSTEMS FOR TRACKED VEHICLES

BACKGROUND OF THE INVENTION

1. Field of the Invention

This invention relates to regenerative transmission systems for tracked vehicles, ie transmission systems in which power given up by the inner track when the vehicle turns is transferred to the outer track, of the type having a rotatable power input member;

a change-speed gear unit coupled to the power input member;

a gear unit member rotatably drivable by the gear unit;

a steering differential having a rotatable steering input member coupled to the power input member and having a first and a second rotatable steering output member arranged so that the sum of their rotational speeds is proportional to the rotational speed of the steering input member;

a first and a second drive differential coupled to the gear unit output member and the first and second steering output member, respectively, and having a first and a second rotatable output member, respectively, the first and second drive differentials being configured such that the rotational speed of the first and second output members is equal to a linear combination of the rotational speeds of the gear unit output member and of the first and second steering output member, respectively; and a first and a second steering brake associated with the respective steering output members.

Such a transmission system will be referred to hereinafter as "a transmission system of the type specified".

2. Description of the Prior Art

In known transmission systems of the type specified the steering differential is a spur gear differential the cage of which is directly geared to the power input member and the steering output members are half-shafts the sum of whose rotational speeds is thus a fixed multiple of the rotational speed of the input member. Such systems are known as triple differential transmission systems. When a vehicle fitted with a triple differential transmission system is moving in a straight line the output members, which drive the tracks of the vehicle, are rotated at the same speed made up of two components combined by the drive differentials. The components consist of the rotational speed of the gear unit output member and the rotational speed of one of the two steering differential half-shafts. To steer the vehicle one of the steering brakes is applied to bring the corresponding steering differential half-shaft to rest. Because the sum of the rotational speeds of the half-shafts is maintained at a constant value by the steering differential, assuming a fixed engine speed, the other half-shaft speeds up to rotate at twice its previous rate. The effect on the output shafts driving the tracks is to speed up one and slow down the other by the same amount, which amount is independant of the gear ratio selected by the change-speed gear unit.

Such transmission systems are well proven in service, relatively reliable and not unduly expensive to manufacture, compact, and efficient in power usage which make them attractive for use with heavy duty tracked vehicles such as tanks. However, it is a characteristic of such systems that although there is a different radius of turn for each gear ratio the maximum rate of turn, obtained when the vehicle engine is rotating the input member at the maximum speed, is constant for all the gear ratios. Consequently, as higher gear ratios are selected the maximum lateral acceleration experienced by the vehicle when it turns increases.

The safe maximum speed of the vehicle is the speed at which, in a turn, the maximum lateral acceleration becomes equal to the accepted skid out limit at which the adhesion of the track on the ground will fail.

For a vehicle with a low maximum speed the transmission system can be designed to have a relatively high value of maximum rate of turn thus providing the vehicle with high manoeuvrability at low speeds. However, if this known transmission system is used for a vehicle with a high maximum speed, such as a tank, it must have a relatively low maximum rate of turn to allow the vehicle to turn with safety at its top speed. This correspondingly decreases its low speed manoeuverability which is a serious disadvantage.

SUMMARY OF THE PRESENT INVENTION

It is an object of the present invention to obviate the foregoing disadvantage by providing a regenerative transmission system that provides a tracked vehicle with a maximum rate of turn that decreases with increasing forward gear ratio.

According to the present invention there is provided a transmission system of the type specified in which the steering input member is coupled to both the gear unit output member and the power input member by a modifying differential arranged such that the rotational speed of the steering input member is equal to a multiple of the rotational speed of the power input member less a multiple of the rotational speed of the gear unit output member when a forward gear ratio is engaged. With this arrangement the amount by which the speed of the output members increase or decrease when one of the steering brakes is fully applied decreases as higher gear ratios are engaged (for a given engine speed) thereby decreasing the maximum rate of turn of the vehicle for the higher gear ratios.

Preferably the modifying differential comprises a planetary gearset, the sun gear of the planetary gear set being coupled to the change-speed gear unit output shaft, the planet carrier being coupled to the power input member so that it is rotated at a speed proportional to the rate of rotation of the input shaft, and the ring gear being coupled to the steering input member.

BRIEF DESCRIPTION OF THE DRAWINGS

An embodiment of the invention will now be described, by way of example only, with reference to the accompanying drawings of which FIG. 2 is a graph of the rates of turn plotted against vehicle speed for a typical triple differential transmission system and for a transmission system according to the present invention.

DESCRIPTION OF THE PREFERRED EMBODIMENT

Figure 1:
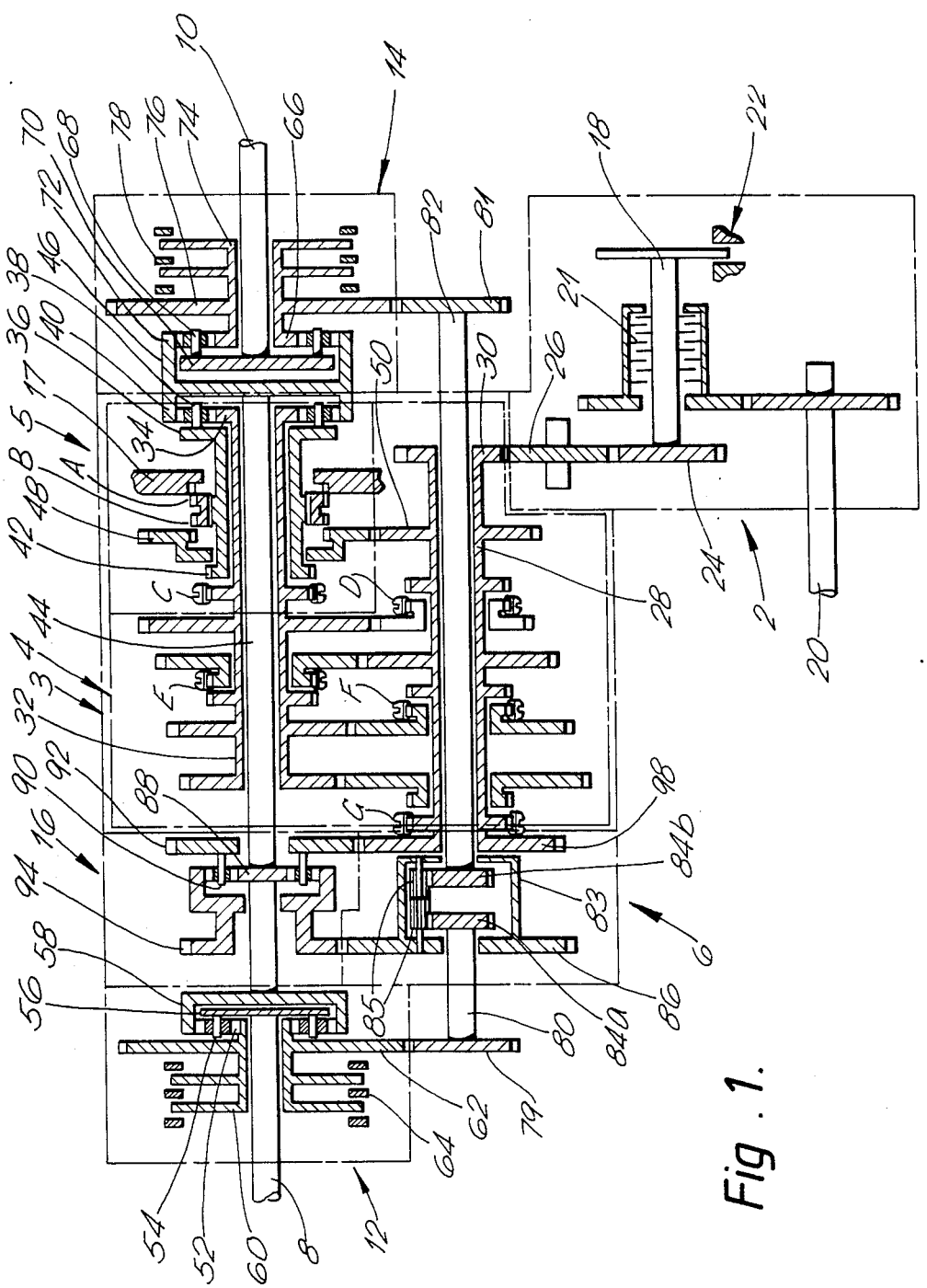
FIG. 1 is a schematic drawing of a steering system having an epicyclic modifying differential.

Referring to FIG. 1 there is shown a transmission system comprising a power input means 2, a change-speed gear unit 3, a steering differential 6, a first and a second output shaft 8 and 10, respectively, a first and a second output differential 12 and 14, respectively, and a modifying differential 16. A section of a housing 17 in which the steering system is located is shown in the gear unit 3.

The power input means 2 comprises a shaft 18 connectable to an engine output shaft 20 by means of an input clutch 21. Fixed to the shaft 18 is a disc brake 22 by which means the rotational speed of the shaft 18 may be reduced, and an output gear 24 permanently meshed with an idler gear 26.

The change-speed gear unit 3 comprises a conventional four-speed twin shaft gearbox 4 having dog clutches D, E, F and G, together with an epicylic modechanger 5 having dog clutches A, B and C. The required gear ratio is selected by engaging one of the clutches D, E, F or G in conjunction with an appropriate one or more clutches A, B or C, or by engaging clutches B and C, and none of the gearbox clutches.

The gearbox 4 is driven by a hollow primary shaft 28 which constitutes the power input member, geared to the idler gear 26 of the power input means 2 by a fixed gear 30. By engaging one of the dog clutches D, E, F or G the power from the primary shaft 28 is transmitted to a hollow secondary shaft 32, common to the gearbox 4 and the modechanger 5.

The modechanger 5 includes a three element gear set having a sun gear 34, a planet carrier 36 with planet gears 38, and a ring gear 40 which constitutes the gear unit output member. The sun gear 34 is fixed to the secondary shaft 32. The planet carrier 36 is fixed to a hollow shaft 42 co-axial with, and rotable about, the secondary shaft 32. The power output from the modechanger 5 is taken from the ring gear 40 and transmitted to the first output differential 12 by means of a shaft 44 located co-axially within both the secondary shaft 32 and the shaft 42, is taken directly to the second output differential 14 by means of a connecting sleeve 46.

A ring gear 48 is mounted co-axially on, and rotatable about, the shaft 42. It is in constant mesh with a gear 50 fixed co-axially to the primary shaft 28 of the gearbox 4.

The rate of rotation of the ring gear 40 is not determined until the rates of rotation of both the sun gear 34 and the planet carrier 36 are fixed. For a given engine speed these rates of rotation are determined by the clutches selected in the gearbox 4 and the modechanger 5.

The modechanger 5 can be operated in any one of five modes.

In the first mode the shaft 42 is locked to the ring gear 48 by means of the dog clutch B thereby ensuring that the planet carrier 36 rotates at a speed proportional to the speed of the primary shaft 28. In this second mode the faster the sun gear 34 rotates relative to the planet carrier 36 in the same direction, the slower the rate of forward rotation of the output ring gear 40, thus by consecutively selecting the four ascending gear ratios in the gearbox 4 the ring gear 40 of the modechanger unit 5 will rotate at four consecutively descending forward gear ratios to give the four lowest forward gear ratios of the change-speed gear unit 3.

In the second mode the planetary gear elements of the modechanger 5 are locked by clutching the shaft 42 to the secondary shaft 32 by means of the dog clutch C. The four ascending gear ratios of the gearbox 4 may then be selected to give the four highest forward gear ratios of the change-speed gear unit 3.

In the third mode both clutches B and C are engaged. The planetary gear elements of the modechanger 5 are locked and rotated as a unit by means of the fixed gear 50 and the ring gear 48 rather than by the secondary shaft 32, as was the case in the first mode. The gearing is arranged to produce a gear ratio which is intermediate the lowest of the high gear ratios produced by the second mode and the highest of the low gear ratios produced by the first mode. This means that it is possible to cycle through all nine successive forward gear ratios, and certain selections from them, whilst making only one clutch change between any consecutive two ratios.

In the fourth mode the shaft 42 is prevented from turning by means of the dog clutch A which locks the shaft 42 relative to the housing 17 so that the modechanger 5 acts as a reversing unit giving four reverse gears as the four gear ratios are selected in the main gear unit 4.

In the fifth mode both clutches A and C are engaged. The planetary gear elements of the modechanger 5 are then locked and fixed relative to the housing 17 thus preventing rotation of the gear unit output member 40.

The capability of moving between successive forward gear ratios by disengaging one clutch and re-engaging another makes it possible to use a microprocessor control to synchronise the clutch changes by controlling the operation of the input clutch 21, the input brake 22, the engine speed and the clutches A, B, C, D, E, F and G at the appropriate time to ensure good quality gear changes. This in turn means that it is possible to use dog clutches with no synchromesh control thereby reducing the component size and weight of the system.

The first drive differential 12 comprises a three-element planetary gear set mounted coaxially with the shaft 44. It comprises a sun gear 52, planetary gears 54 mounted on a planet carrier 56 and a ring gear 58. The ring gear 58 is fixed to the shaft 44 and is therefore rotated by the ring gear 40 of the modechanger 5. The planet carrier 56 is fixed to the first output shaft 8 which is in turn connected to drive the first track of the vehicle (not shown). The sun gear 52 is fixed to a hollow shaft 60 coaxial with, and rotatable about, the first output shaft 8. Fixed to the shaft 60 is a gear 62 and a first twin disc steering brake 64 of conventional design.

The second drive differential 14 is of the same construction as the first output differential 12 and comprises a sun gear 66, planetary gears 68 mounted on a planet carrier 70, and a ring gear 72. The ring gear 72 is directly connected to the ring gear 40 of the modechanger 5 by the connecting sleeve 46. The sun gear 66 is fixed to a hollow shaft 74 coaxial with, and rotatable about, the second output shaft 10. A gear 76 and a second twin disc steering brake 78 are fixed to the shaft 74. The planet carrier 70 is fixed to the second output shaft 10 which is in turn connected to drive the second track of the vehicle (not shown).

The sun gear and the annulus of each drive differential 12 and 14 are driven in the same rotational sense when the forward gear ratios are selected. This drive method is more efficient than the conta-rotating method employed on known triple differential systems but has the effect of reducing the effective spread of the change-speed gear unit 3. The spread has been increased in this embodiment to compensate.

Another advantage of this method of driving the elements of the output differentials 12 and 14 is that by locking the output from the change-speed gear unit 3, the fourth mode of the modechanger, a very low forward ratio can be obtained through the steering differential 6.

The steering differential 6 comprises a spur gear differential of conventional design having a cage 83, constituting the steering input member, spur gears 84a and 84b, and spur pinions 85. The cage 83 is rotatable coaxially about half-shafts 80 and 82, constituting the first and second steering output member, respectively, fixed to the spur gears 84a and 84b by a gear 86 fixed to the cage 83. The steering differential 6 is arranged so that the sum of the rotational speeds of the half shafts 80 and 82 is equal to twice the rotational speed of the gear 86. Thus the difference in speeds of the output shafts 8 and 10 when one of the steering brakes 64 and 78 has been applied is equal to twice the speed of rotation of the cage 83.

The gear 62 of the first drive differential 12 and the gear 76 of the second drive differential 14 are enmeshed with a gear 79 fixed to the first half shaft 80, and with a gear 81 fixed to the second half shaft 82, respectively, the half shaft 82 being mounted for coaxial rotation within the hollow input shaft 28.

The modifying differential 16 is a three element planetary gear set mounted coaxially on the shaft 44 comprising a sun gear 88, planetary gears 90 mounted on a planet carrier 92, and a ring gear 94. The sun gear 88 is fixed to the shaft 44 and therefore rotates at a speed equal to the output speed of the ring gear 40 of the modechanger 5. The planet carrier 92 is a ring gear which is in constant mesh with a ring gear 98 fixed coaxially to the primary shaft 28. The ring gear 94 is in constant mesh with the gear 86 fixed to the cage 83 of the steering differential 6.

At a given engine speed and with the input clutch 21 engaged the primary shaft 28 rotates the planet carrier 92 of the modifying differential 16 at a constant rate. As higher gear ratios are selected by the combination of clutches in the gearbox 4 and modechanger 5 so the shaft 44 rotates the gun gear 88 at an increasing rate in the same sense as the planet carrier 92. This results in the ring gear 94, and consequently the cage 83 of the steering differential 6, being rotated at a speed which decreases as the overall gear ratio of the change-speed gear unit 3 increases. The difference in speeds of rotation of the first output shaft 8 and the second output shaft 10 when the vehicle is executing a turn, ie when one or other of the steering brakes 64 and 78 is applied, therefore decreases as higher gear ratios are engaged thereby reducing the maximum rate of turn of the vehicle for higher gear ratios.

Referring now to FIG. 2 there is shown the steering characteristics of a typical triple differential transmission system, Graph A, a transmission system according to the present invention, Graph B, and the skid out limit when the limit of adhesion is U=0.5, Graph C.

For a skid out limit of U=0.5 and a top vehicle speed of 90 km/h it can be seen that a triple differential transmission system must be arranged such that the maximum rate of turn in any gear ratio is equal to 0.3 radians per second or less. Using the transmission system according to the present invention it is possible to ensure that the vehicle does not exceed the skid out limit at its top speed yet has a maximum rate of turn in the lowest gear ratio in excess of 0.5 radians per second.

In this embodiment the maximum rates of turn increase with increasing reverse gear ratios but this is not a serious disadvantage as the maximum reverse speed is generally limited to about 30% of the maximum forward speed so the maximum safe lateral acceleration will not be exceeded. If the reversing unit were provided separately from the modechanger 5 and situated before the input to the modifying differential 16 then the characteristics of the reverse gear ratios would be similar to the forward gear ratios.

The increase in volume of the present invention over the triple differential transmission system is small because the whole transmission system can be mounted about the same two axes as the change-speed gear unit thereby resulting in a compact assembly.

I claim:

1. A transmission system having
   a rotatable power input member;
   a change-speed gear unit coupled to the power input member;
   a gear unit output member rotatably drivable by the gear unit;
   a steering differential having a rotatable steering input member coupled to the power input member and having a first and a second rotatable steering output member arranged so that the sum of their rotational speeds is proportional to the rotational speed of the steering input member;
   a first and a second drive differential coupled to the gear unit output member and the first and second steering output member, respectively, and having a first and a second rotatable output member, respectively, the first and second drive differentials being configured such that the rotational speed of the first and second output members is equal to a linear combination of the rotational speeds of the gear unit output member and of the first and second steering output member, respectively;
   a first and a second steering brake associated with the respective steering output members; and
   a modifying differential coupled to the gear unit output member, the power input member and the steering input member;
   the modifying differential being arranged so that the rotational speed of the steering input member is equal to a multiple of the rotational speed of the power input member less a multiple of the rotational speed of the gear unit output member when a forward gear ratio is engaged.

2. A transmission system as claimed in claim 1 in which the modifying differential is a planetary gear set including a sun gear coupled to the gear unit output member, a ring gear coupled to the steering input member and a planet carrier coupled to the power input member.

3. A transmission system as claimed in claim 2 in which the sun gear is coaxial with the gear unit output member.

* * * * *